(12) United States Patent
Ghezzal et al.

(10) Patent No.: US 12,282,808 B2
(45) Date of Patent: Apr. 22, 2025

(54) DATA INTEGRITY MONITORING AND FEEDBACK CONTROL FOR CLOUD-BASED COMPUTING

(71) Applicant: AMADEUS S.A.S., Biot (FR)

(72) Inventors: Israe Ghezzal, Villeneuve Loubet (FR); Davide Sanapo, Mougins (FR); Guillaume Michaud, Mouans-sartoux (FR)

(73) Assignee: AMADEUS S.A.S., Biot (FR)

( * ) Notice: Subject to any disclaimer, the term of this patent is extended or adjusted under 35 U.S.C. 154(b) by 206 days.

(21) Appl. No.: 17/897,818

(22) Filed: Aug. 29, 2022

(65) Prior Publication Data

US 2024/0069985 A1    Feb. 29, 2024

(51) Int. Cl.
*G06F 9/54* (2006.01)
*G06F 16/182* (2019.01)
*G06F 16/17* (2019.01)
*G06F 16/23* (2019.01)

(52) U.S. Cl.
CPC ............ *G06F 9/542* (2013.01); *G06F 16/182* (2019.01); *G06F 16/1734* (2019.01); *G06F 16/2365* (2019.01)

(58) Field of Classification Search
CPC .......... G06F 9/542; G06F 9/546; G06F 11/00; G06F 16/182; G06F 16/1734; G06F 16/23; G06F 16/2365; G06F 2201/86
See application file for complete search history.

(56) References Cited

U.S. PATENT DOCUMENTS

| | | | |
|---|---|---|---|
| 9,852,139 B1* | 12/2017 | Chepa | H04L 67/1095 |
| 10,121,003 B1* | 11/2018 | Adams | G06F 21/565 |
| 10,650,146 B1* | 5/2020 | Gaurav | G06F 21/562 |
| 2015/0302149 A1* | 10/2015 | Whitsitt | G16H 10/60 705/3 |
| 2016/0292193 A1* | 10/2016 | Madanapalli | G06F 21/6218 |
| 2016/0357778 A1* | 12/2016 | MacKenzie | G06F 13/36 |
| 2018/0048658 A1* | 2/2018 | Hittel | G06F 21/565 |
| 2018/0218167 A1* | 8/2018 | Narayanaswamy | H04L 63/0435 |
| 2020/0201840 A1* | 6/2020 | Pfeiffer | G06F 16/2365 |
| 2022/0131879 A1* | 4/2022 | Naik | H04L 63/1416 |
| 2022/0138158 A1* | 5/2022 | Olson | G06F 16/2455 707/827 |
| 2022/0164445 A1* | 5/2022 | Poleg | G06F 16/14 |
| 2022/0342851 A1* | 10/2022 | Singh | G06F 16/128 |
| 2023/0076201 A1* | 3/2023 | Bebchuk | H04L 63/1416 |
| 2023/0153325 A1* | 5/2023 | Ceesay | G06N 7/01 707/610 |
| 2023/0327875 A1* | 10/2023 | Tsai | H04L 9/0819 726/9 |

* cited by examiner

*Primary Examiner* — Kevin L Young
*Assistant Examiner* — Jennifer Marie Gutman
(74) *Attorney, Agent, or Firm* — Perry + Currier Inc.

(57) ABSTRACT

The present specification provides data integrity monitoring and feedback in cloud-based computing platforms. While such platforms are ubiquitous and provide a means for globally scaled computing, the need for reliable data integrity also increases with scaling. A system in accordance with an embodiment includes a data integrity monitoring engine that integrates with existing cloud computing platforms and monitors events corresponding to receipt of files and checking the frequency and size of those files.

7 Claims, 8 Drawing Sheets

DATA INTEGRITY MONITORING AND FEEDBACK CONTROL FOR CLOUD-BASED COMPUTING

BACKGROUND

Cloud computing offers a powerful computational resources across the globe, including the ability to provide powerful normalization of data from different servers operating under different conditions. The resulting normalized data can then be used to control other systems.

SUMMARY

An aspect of the present specification provides a data integrity monitoring system for a cloud-based computing platform comprising a cloud server. The cloud server is connectable to a data source engine via a network. The cloud server has a storage unit and a file server for receiving data from the data source engine and for saving the data in the storage unit. An event handler is connectable to the file server for detecting the events representing the saving of the data. A queuing engine is connectable to the event handler for storing metadata of the events. A monitoring engine is also connectable to the cloud server for processing characteristics of the metadata to determine event data integrity. The monitoring engine is configured to initiate a response process if the integrity of the metadata characteristics meet a predetermined criteria.

The data integrity can be based on an expected temporal continuity of receipt of events.

The data integrity can be based on an expected data magnitude of events.

The cloud server can be connectable to at least one data aggregation engine.

The response process can control availability of partition data associated with the events to an engine that accesses the partition data.

The monitoring engine can be incorporated into the cloud server.

Another aspect of the specification provides a monitoring engine comprising an interface to a network for connection, via the network to at least one data source engine connected to the network. The monitoring engine is also for connection to a cloud server which is also connected to the data source engine. The cloud server includes a storage unit and a file server for receiving data from the data source engine and saving the data in the storage unit. The cloud server also includes an event handler connected to the file server for detecting events associated with the saving of the data. The cloud server also includes a queuing engine connected to the event handler for storing metadata of the events. The monitoring engine is configured to process characteristics of the metadata to determine event data integrity. The monitoring engine is also configured to initiate a response process if the integrity of the metadata characteristics meet a predetermined criteria.

The data integrity can be based on an expected temporal continuity of receipt of events.

The data integrity can be based on an expected data size of events.

The monitoring engine can further comprise a connection to at least one data aggregation engine connected to the network.

The response process can be an alarm message sent to the data aggregation engine.

The monitoring engine can be incorporated into the cloud server.

Another aspect of the specification provides a method of controlling a response to a data integrity failure comprising:
detecting an event corresponding to a new partition within a pre-existing container;
generating a set of new metadata representing characteristics of the container;
comparing the new metadata with a previous metadata representing characteristics of the container prior to the event; and
initiating a response process if the comparing meets a predefined criteria.

The method can occur inside a cloud server.

The characteristics can comprise a time of arrival of the event, and the predefined criteria is based on when the time between the arrival of the new event and the previous event is exceeded.

The characteristics can comprise a size of the partition and the predefined criteria is based on when a difference between the size of the partition of the new event and the size of the partition of the previous event is greater or less than a predefined threshold.

The characteristics can comprise a number of files in the partition and the predefined criteria is based on when the difference between number of files in the partition of the new event and the number of the partition of the previous event is greater or less than a predefined threshold.

The characteristics can comprise a data magnitude of the partition and the predefined criteria is based on when the difference between the data magnitude in the partition of the new event and a data magnitude of the previous event is greater or less than a predefined threshold.

The response process can comprise controlling an interactive graphical interface on a client device to prevent response input based on contents of the container associated with the event.

The event can occur inside an event handler engine of the cloud server and the container can be maintained by a file server and storage within the cloud server.

The partition can be populated by a data source engine that connects to the cloud server and the partition is ready by an aggregation engine that connects to the cloud server.

DETAILED DESCRIPTION

Cloud computing platforms are ubiquitous. Nonlimiting examples of popular cloud computing platforms include Azure™ Cloud Services ("Azure"), Amazon™ Web Services ("AWS") and Google™ Cloud Platform ("Google Cloud"). Cloud computing offers the ability to rapidly network hundreds-of-thousands of servers and client computers with powerful collective computational resources across diverse geographies. Such power offers the ability to normalize, process and generate outputs that can be used to control other computational resources on a global scale, often in real-time. The complexity of such systems render them susceptible to erroneous performance. A single point of failure, either within the platform itself or with the computers that connect to the platform, can lead to significant adverse consequences. Data integrity monitoring can be critical to implementing responses to control and mitigate the effect of such failures. While many data integrity functions are built into cloud computing platforms, and even though such platforms have existed for years and are increasingly mature, serious data integrity lapses can still occur. An example of a specific data integrity lapse that can be mitigated using the present invention involves the aggregation of data files from different data sources that depend on the timing and/or size of the data files that are received from each source.

The travel industry is one example of where certain data integrity failures can be serious. For example, travel industry data sources can include data from servers hosted by travel actors such as airlines, trains, cruise ships and other transportation services. Other travel actors may include hotels, restaurants, spas or other hospitality providers. Example data aggregators can include travel booking engines, or an intermediator that acts on behalf of the travel booking engines. Travelers operating their client device (such as laptops, desktop computers, smart phones and tablets) depend on the accuracy of the normalized data from the data aggregator to assess options and, in turn, send booking requests. Since the data source servers are operated by different entities according to different computational architectures, lapses and/or errors in the frequency or size of transmissions to the aggregator can lead to the cascading effect of delivering erroneous data to client devices. Such erroneous data may fail to indicate, for example, cancellations, availability or pricing. The result can be that even a single failure by a single travel actor can undermine faith in the reliability of the aggregated data altogether. From a technical standpoint, such failures lead to wasted network traffic resources and wasted computational processing resources in the cloud computing platform across the entire Internet itself.

Figure 1:
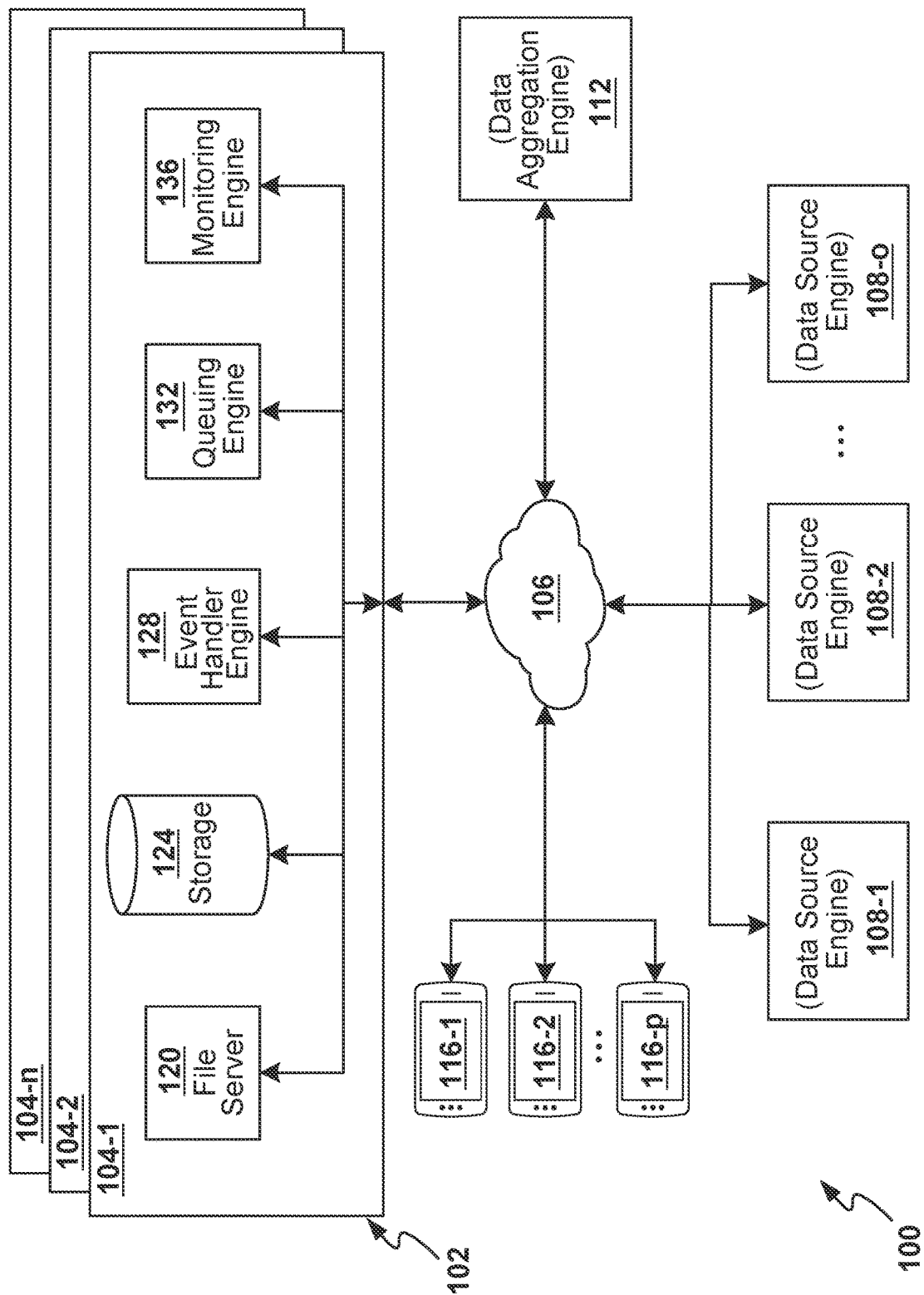
FIG. 1 is a schematic diagram of a system for data integrity monitoring and feedback control in a cloud computing platform.

FIG. 1 shows a system for data integrity monitoring and feedback control indicated generally at 100. System 100 comprises a cloud computing platform 102 which in turn comprises a plurality of cloud-computing engines 104-1, 104-2 . . . 104-*n*. (Collectively, cloud-computing engines 104-1, 104-2 . . . 104-*n* are referred to as cloud-computing engines 104, and generically, as cloud-computing engine 104. This nomenclature is used elsewhere herein.) Cloud computing engines 104 can be multiple and/or mirrored instances of each other, or standalone cloud computing engines 104. Cloud computing platform 102 can be based on, for example, known platforms which have cloud-computing engines 104 that can be leased by other enterprises, such as Azure, AWS or Google Cloud. Other platforms will now occur to those of skill in the art, including proprietary platforms where one or more cloud-computing engines 104 that are owned by a particular enterprise rather than leased platforms such as Azure, AWS and Google Cloud.

In system 100, platform 102 connects to a network 106 such as the Internet. Network 106 interconnects platform 102, a plurality of data source engines 108, at least one data aggregation engine 112, and a plurality of client devices 116.

(It will be understood with the benefit of the specification that the data source engine 108 and data aggregation engine 112 can include each other's functions, in that aggregation engine 112 can include the functionality of a data source engine 108, and one or more of the data source engines 108 can include the functionality of the data aggregator engine 112. However, for the purposes of simplifying explanation of the present embodiment, the following discussion will assume a crisp distinction between data source engines 108 and data aggregator engine 112. Once this explanation is understood, a person of skill in the art will recognize how the present invention scales to more complex scenarios where a given data source engine 108 or data aggregation engine 112 may additionally include each other's functionality.)

As will be explained in greater detail below, each data source engine 108 can be based off its own computing architecture and will periodically send data files of a predefined format to cloud computing platform 102. In a present example embodiment, data source engines 108 are operated by travel actors within the travel industry, including, but not limited to, airlines, railway systems, car rental agencies, cruise line operators, hotels, resorts, and spas.

In turn, data aggregation engine 112 periodically receives the data files that have been sent by data source engines 108 via cloud computing platform 102. In the present example embodiment, travel aggregation engine 112 is operated by, or accessed by, for example, a travel booking engine. To elaborate, a travel booking engine could include well-known travel booking engines such as Expedia™, Travelocity™ or Hotels.com™. There are many other travel booking engines as well. Thus data aggregation engine 112 can be hosted directly by such a travel booking engine, or can be a hosted by a travel data aggregator, often referred to as a Global Distribution System ("GDS"), such as Amadeus™, Sabre™, Travelport™, Apollo™ and Galileo™. It is therefore to be understood that data aggregation engine 112 need not include the ability to serve as a booking engine, but rather the teachings herein ultimately can improve the technological efficiency and computational resource utilization of travel booking engines and other engines (not shown) that make use of the data aggregated by data aggregation engine 112.

It is to be re-emphasized that the present examples focusing on the travel industry are non-limiting, and that the present invention can apply to other cloud computing applications and industries, including for example, the financial services industry and the associated electronic trading of financial instruments.

It will be understood that data source engines 108 and data aggregation engine 112 themselves, may be hosted on a cloud computing platform. However, for illustrative purposes, in system 100, cloud computing platform 102 is the technological infrastructure that intermediates the flow of data from data source engines 108 to data aggregation engine 112, and the technology used to implement the data source engines 108 to data aggregation engine 112 is not particularly limited by this specification.

Client devices 116 can be laptop computers, desktop computers, mobile phones, tablet computers and any other device that can be used by consumers to receive aggregated data from data aggregation engine 112. In the context of the travel industry, client devices 116 interact with system 100 by, for example accessing travel booking engines which in turn rely on data from data aggregation engine 112.

Turning to cloud computing engine 104, FIG. 1 shows the inclusion of a file server 120, a storage 124, an event handler engine 128, a queuing engine 132 and a monitoring engine 136. File server 120 and storage 124 work together as a unit to provide access (including read, write, and delete functions) to data files to authorized data source engines 108 and data aggregation engine 112. File server 120 and storage 124 are thus the computing components which controls the basic data storage and access functions of cloud computing engine 104.

Event handler engine 128 is a complete event routing service that manages and monitors events, or state changes, received at cloud computing platform 102, including events received from data source engines 108 and data aggregation engine 112. Where cloud computing platform 102 is based on Azure, the event handler engine 128 corresponds to the Microsoft's "Azure Event Grid". Where cloud computing platform 102 is based on AWS, the event handler engine 128 corresponds to the AWS "EventBridge" event bus. Where cloud computing platform 102 is based on Google Cloud, the event handler engine 128 corresponds to the Google Cloud "Eventarc" bus.

Queuing engine 132 is a messaging queue that works with event handler engine 128 to prioritize and keep track of messages. A queuing engine 132 can take the form of asynchronous service-to-service communication used in serverless and microservices architectures. A queuing engine 132 can decouple applications and services to provide load balancing. Where cloud computing platform 102 is based on Azure, the queuing engine 132 corresponds to the Microsoft's "Azure Service Bus". Where cloud computing platform 102 is based on AWS, the queuing engine 132 corresponds to the AWS Amazon Simple Queue Serve (SQS). Where cloud computing platform 102 is based on Google Cloud, the event handler engine 128 corresponds to the Google Cloud "Cloud Task" service.

Cloud-computing engines 104 also include a monitoring engine 136 which has no direct analogue in existing cloud computing platforms 102. As will be explained in greater detail below, monitoring engine 136 is configured to monitor the size and frequency of the reception of files from data source engines 108 as stored within storage 124 and to perform data integrity checks thereon and generate report messages of any anomalies.

Figure 2:
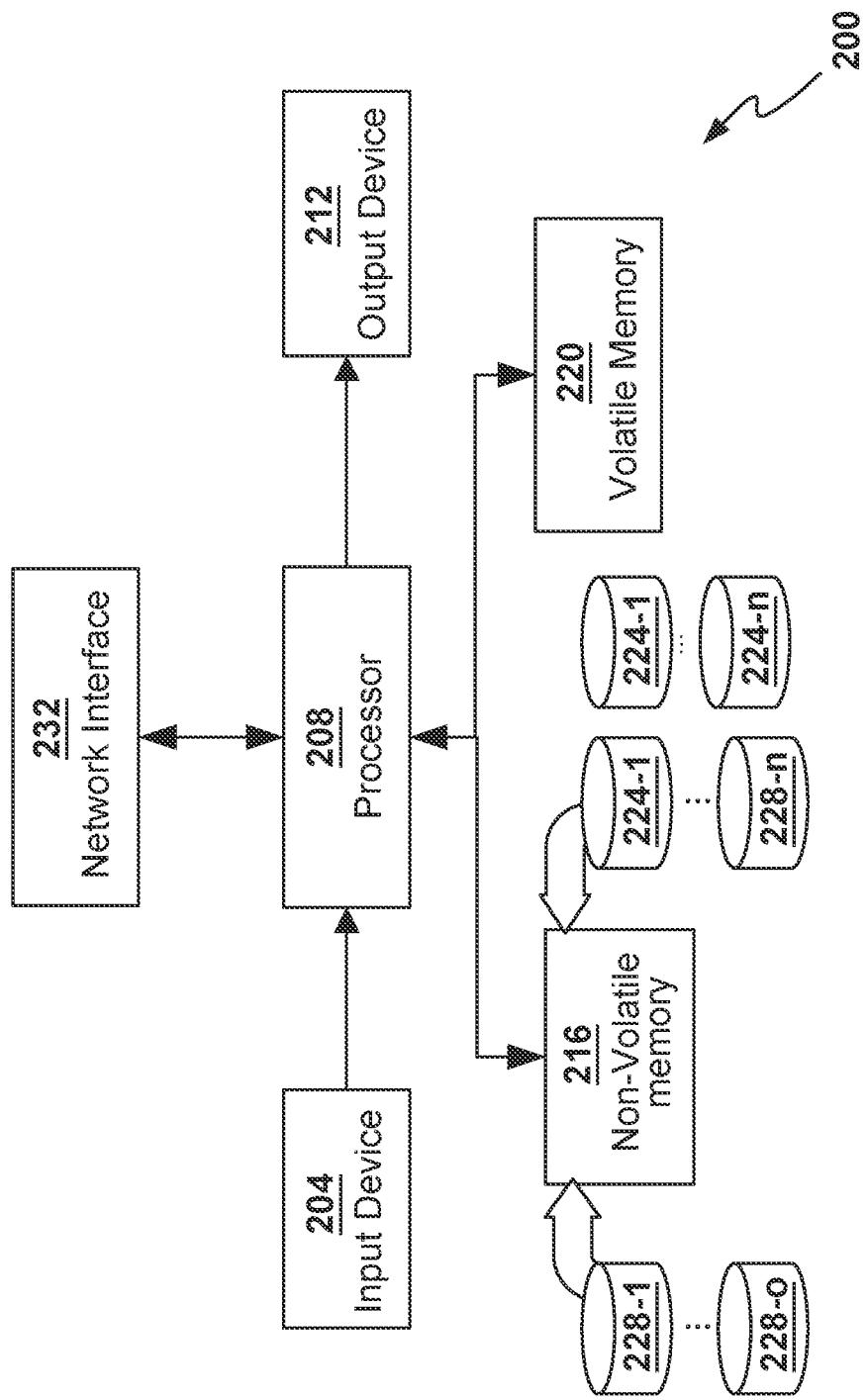
FIG. 2 is a block diagram of example internal components of any server in FIG. 1.

FIG. 2 shows a schematic diagram of a non-limiting example of internal components of a computing device 200. The infrastructure of computing device 200, or a variant thereon, can be used to implement any of the computing nodes, including data source engine 108, data aggregation engine 112, client device 116, file server 120, event handler engine 128, queuing engine 132 or monitoring engine 136. Where desired and/or the context permits, one or more of those nodes can be implemented virtually inside a single computing device 200.

In this example, computing device 200 includes at least one input device 204 which may include a keyboard. Input from device 204 is received at a processor 208 which in turn controls an output device 212 such as a display or other output devices. In variants, additional and/or other input devices 204 or output devices 212 are contemplated, or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of hard-disk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to a network interface 232 which includes a buffer, a modulator/demodulator or MODEM, over the various links and/or internet that connects the server equipment to other server equipment. Network interface 232 can connect device 200 to another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. One or more tables or databases 228 can also be maintained in non-volatile memory 216 for use by applications 224.

Figure 3:
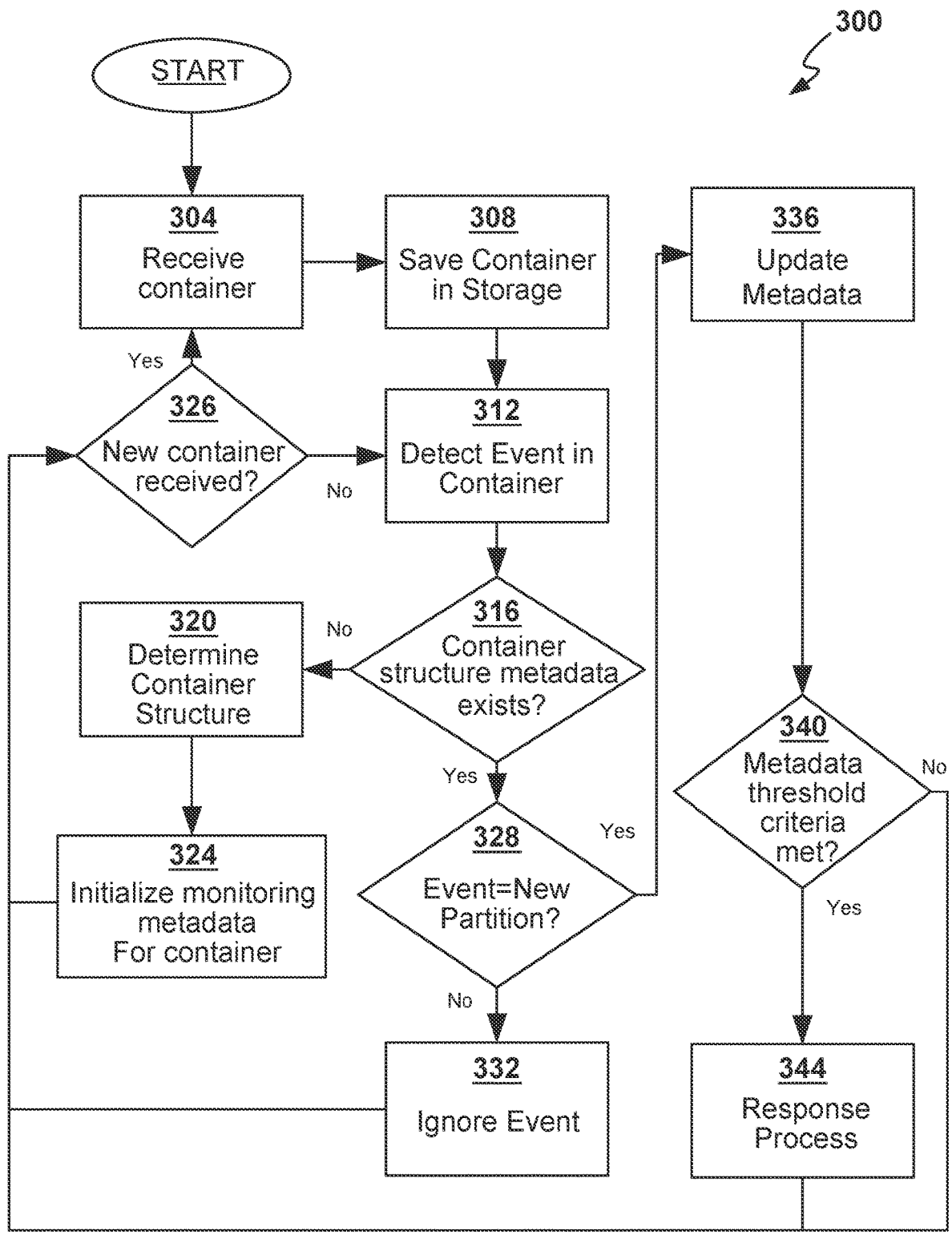
FIG. 3 shows a flowchart depicting data integrity monitoring and feedback control in a cloud-based computing platform.

FIG. 3 shows a flowchart depicting a method for data integrity monitoring and feedback control, indicated generally at 300. Method 300 can be implemented on system 100. Persons skilled in the art may choose to implement method 300 on system 100 or variants thereon, or with certain blocks omitted, performed in parallel or in a different order than shown. Method 300 can thus also be varied. However, for purposes of explanation, method 300 as per the flow chart of FIG. 3 and will be described in relation to its performance on system 100.

Block 304 comprises receiving a container, and block 308 comprises saving the received container in storage. In the context of system 100 the container holds data files sent from a data source engine 108-1 to the file server 120 of cloud computing engine 104-1, which in turn saves the container in storage 124. The container includes a data set, typically in the form of data files that are consistent with the standard to file structure known to file server 120 and storage 124.

Figure 4:
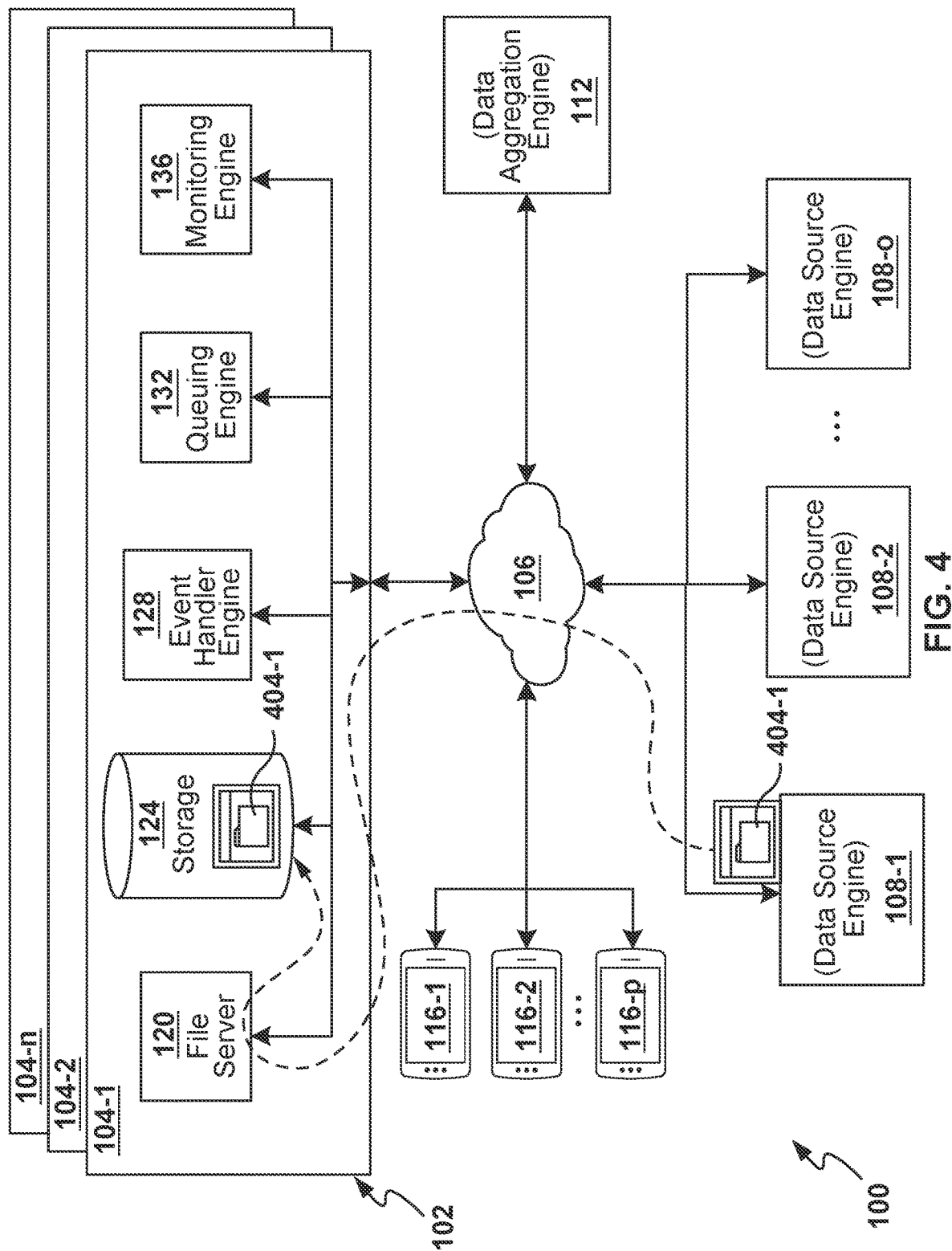
FIG. 4 shows the system of FIG. 1 with data flows of a container from a data source engine to a file storage in the cloud computing platform.

Example performance of block 304 and block 308 is shown in FIG. 4, where a container 404-1 is shown sent from data source engine 108-1 to cloud server 104-1 for saving in storage 124 using commands and controls available from file server 120. FIG. 4 shows a specific example of a container 404-1, and additional specific examples use this nomenclature. Container 404-1 is a specific example to assist in explanation of the present embodiment, and other containers with similar nomenclature are provided for similar explanatory purposes. Generically, however containers herein are referred to as containers 404 or container 404.

In the context of travel actors, containers 404 can include resource availability and timetables corresponding to a travel actor. For example, where a travel actor is an airline, container 404 can include a flight schedule for the airline including origin, destination, seat availability and pricing. Where a travel actor is a railway, container 404 can include a railway schedule including origin, destination, seat availability and pricing. Where a travel actor is hotel, container 404 can include a list of rooms and amenities, including date ranges of availability and pricing.

Block 312 comprises detecting an event within the container saved at block 308. In the context of system 100 and the example in FIG. 4, block 312 is performed by event handler engine 128 which examines container 404-1 and determines that container 404-1 includes a data set that is destined for aggregation engine 112. Event handler engine 128 detects many types of events as will occur to those skilled in the art, but notably for the present invention, event handler engine 128 can detect the creation of a file or a folder inside a container 404. Optionally, the event detected at block 312 is stored in queuing engine 132. The utilization of queuing engine 132 is commonly employed because of the sheer volume of containers that system 100 regularly processes.

A person skilled in the art will appreciate that within the context of implementing method 300 on an existing cloud computing platform 102 such as, but not limited to, Azure, AWS and Google Cloud that the infrastructure to support block 304, block 308 and block 312 is natively available in such existing platforms.

Block 316 comprises determining whether metadata regarding the structure of the container exists. Block 316 is typically performed by monitoring engine 136 which responds to the event handler engine 128 and/or queuing engine 132 having flagged the arrival of container 404-1.

Figure 5:
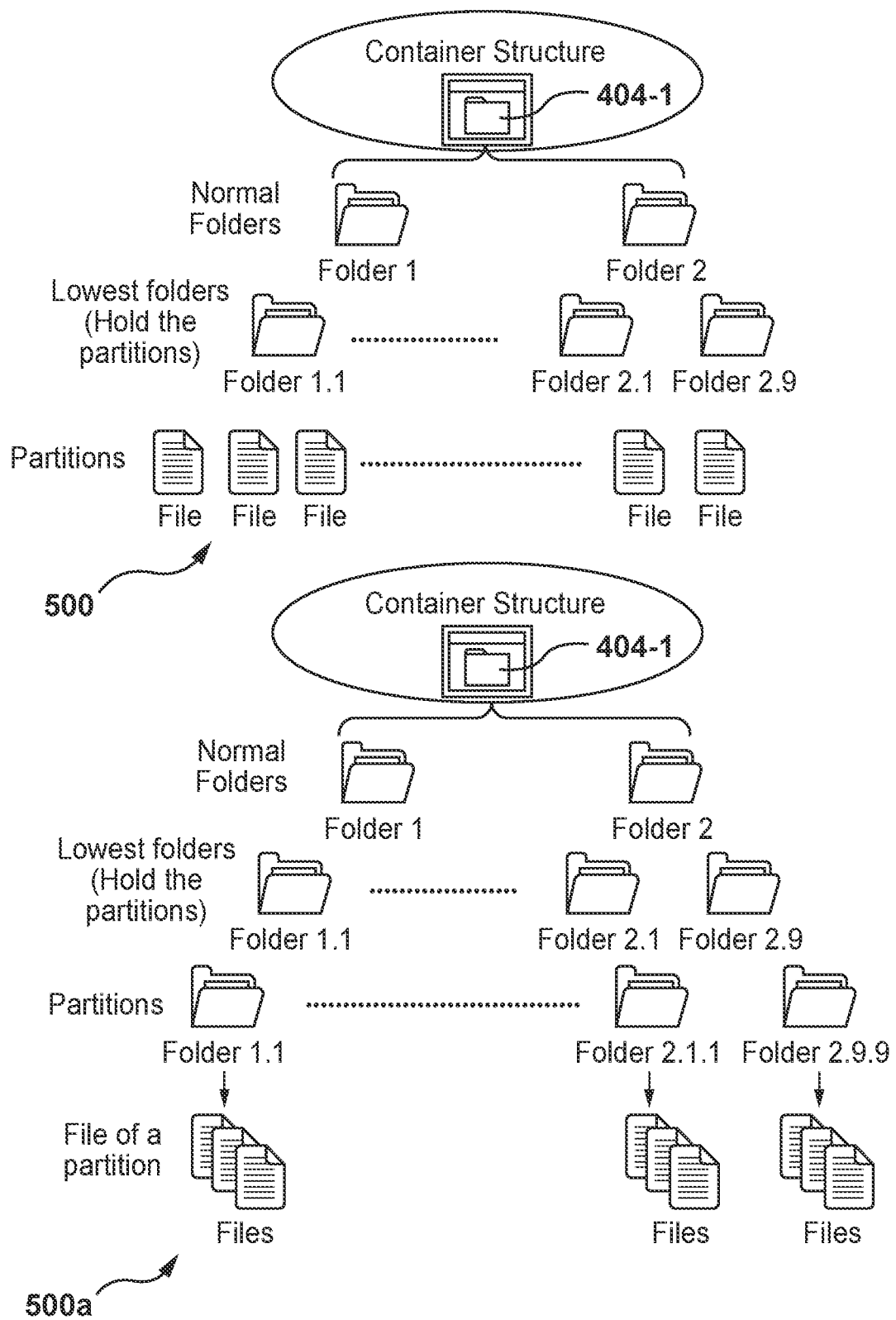
FIG. 5 shows an example structure of containers that can be used in the system.

Before discussing block 316 further, it is useful to elaborate on the concept of a container structure. The container structure refers to anything that uniquely identifies the overall format of a received container 404, and in a present embodiment includes an expected tree of folders, subfolders, partitions and/or files. FIG. 5 shows a first example container structure 500 and a second example container structure 500a known to the Azure™ architecture. Container structure 500 corresponds to a first example generic container 404, while container structure 500a corresponds to a second example generic container 404a. Container structure 500 and container structure 500a each comprise a "Normal Folder" at the top level and one or more cascading "Lower Folders" below the top level. Container structure 500 also comprises one or more "Partitions" at the lowest level contained within each bottom layer "Lower Folder", which comprises a plurality of individual files. In contrast, container structure 500a also comprises one or more "Partitions" at the lowest level of subfolders and then, at the very bottom layer, includes a "File of a Partition" which comprises a plurality of individual files.

Figure 6:
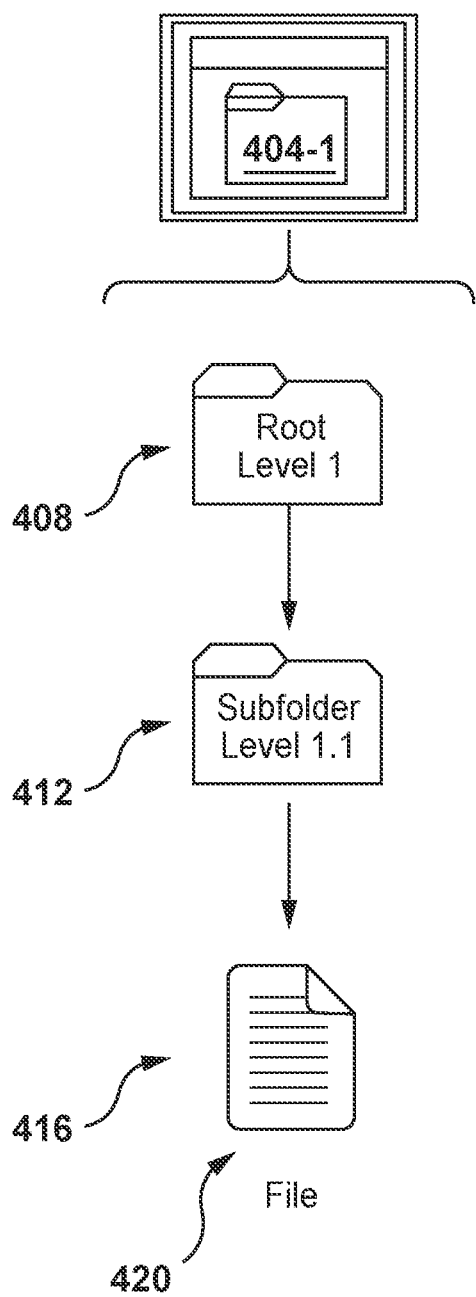
FIG. 6 shows the structure of an example container from FIG. 4.

According to the specific example of FIG. 4 container 404-1 thus adheres to the container structure 500 of generic container 404. FIG. 6 shows example container 404-1 in greater detail, and its adherence to structure 500, to help further illustrate the concept of container structures. Container 404-1 contains one root level folder 408, one sub level folder 412 which contains a single partition 416 containing of one individual file 420—a highly simplified example purely for illustrative purposes.

Thus, returning to our description of block 316 in FIG. 3, monitoring engine 136 determines whether container structure metadata exists. This determination can be based on whether this is the first time that the specific container structure of container 404-1 has been detected by monitoring engine 136, or whether a sufficient number of iterations of container 404-1 have been received a sufficient number of times to ascertain an expected frequency of arrival for container 404-1. In the example of container 404-1, a "no" determination is made at block 316, particularly since this is the first time that container 404-1 has been received. This brings method 300 to block 320 wherein the container structure for the container 404-1 is determined. The information in FIG. 6 is thus extracted at block 320 by monitoring engine 136 and stored and method 300 advances to block 324.

Figure 7:
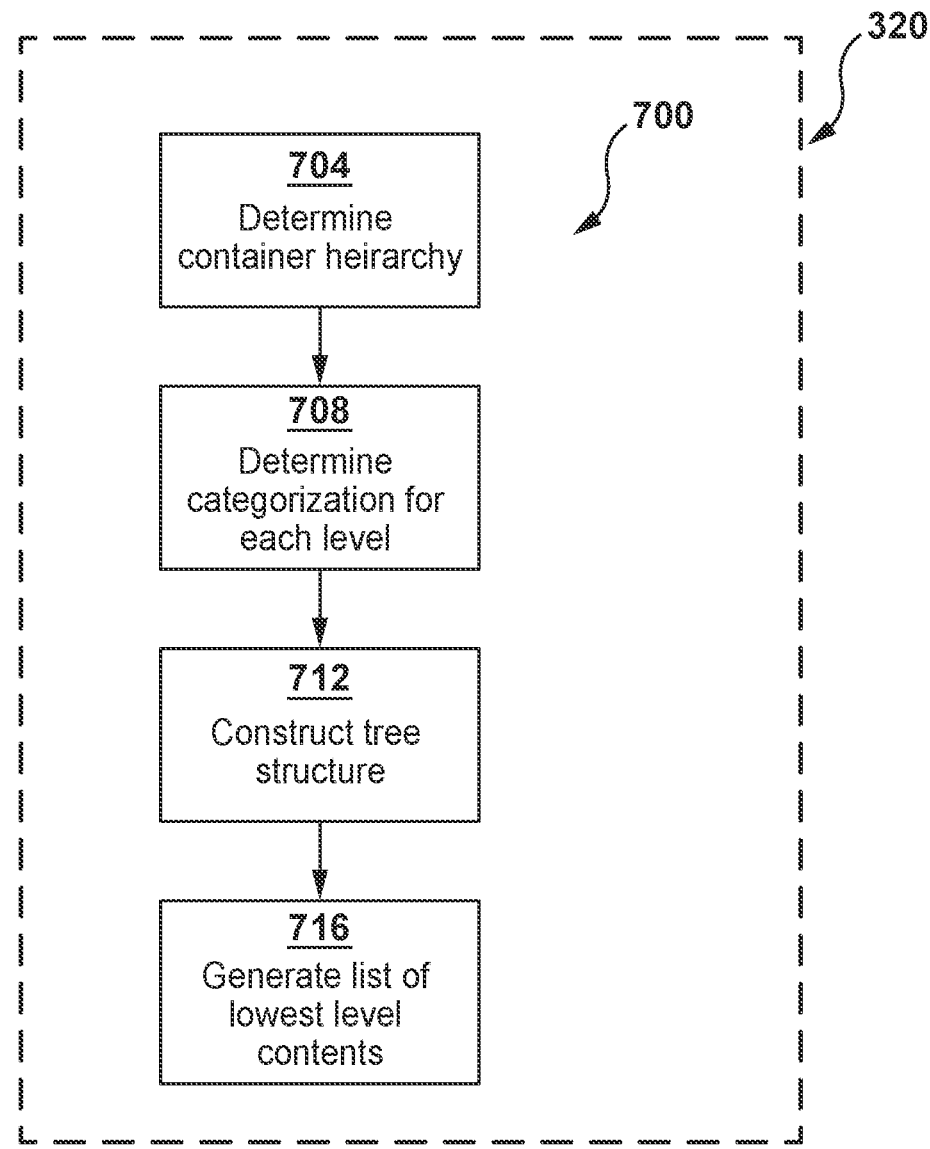
FIG. 7 shows a flowchart of an example embodiment of performance of the initialization of monitoring of the metadata.

FIG. 7 shows a non-limiting example of a method 700 that can be used to implement block 320 of method 300. Block 704 comprises determining a hierarchy of the container. In the example of container 404-1, this is effected by examining the hierarchy in FIG. 6 and creating a schema that represents the hierarchy. Block 708 comprises determining the categorization of each level in the hierarchy, be it a folder, subfolder, partition, file, group of files or other level categorization. Block 712 comprises constructing a tree structure representing the determinations from block 704 and block 708. The tree structure will thus reproduce the hierarchy into an organizational tree structure along with an indication, for each node in the tree, node attributes including type, size and time of arrival. Block 716 comprises generating a list of the contents of the lowest partition of the container, associated with the node attributes from block 712. According to container structure 500, the lowest partition contents will be based on the partition corresponding to the file(s) within the lowest folder(s). (For clarity, the example container 404-1 in FIG. 6 is helpful to assist in understanding. In container 404-1, the lowest partition is partition 416, and the corresponding file to partition 416 is file 420.) According to container structure 500a, the lowest level contents will be based on the group of files of a partition. For convenience, these lowest levels, whether based on individual files, (such as the example file 420), from container structure 500, or plurality of files from structure 500a, will be interchangeably referred to hereafter simply as "lowest partitions" or "LPs" regardless of whether originating from container structure 500 or container structure 500a. Note, however, other ways of effecting block 320 of method 300 are contemplated.

Returning to method 300, at block 324, a monitoring service is initialized for metadata corresponding to container 404-1. Block 324, in the present embodiment, is also performed by monitoring engine 136. In the context of a container 404 or container 404a, the metadata is based on the contents of the lowest partitions or LPs of the container 404 as ascertained at block 716 or a variant thereon. In a present embodiment, the metadata includes an arrival frequency metric ("AFM") and a size metric ("SM") for the contents of the container 404.

The arrival frequency metric or AFM can be based on a variety of factors. In a present embodiment, the arrival frequency metric or AFM is based on an examination of the lowest partitions and examining different times of arrival for each item in the lowest partition. (Items refer to the file or files, or their contents, within the lowest partition.) Note that each item in the lowest partition may have its own arrival frequency. For example, in the travel industry, an airline may update its flight schedule for a daily flight between two cities more frequently than for a weekly flight between to different cities. Thus, a container 404 holding such a schedule may use two different lowest partitions, with one partition for each flight, and those two different lowest partitions may be updated at different frequencies. Thus, each items in the lowest partition may update at different frequencies. Accordingly, the AFM metadata can be based on first assigning a "Partition Frequency Arrival" or "PFA" based on an interval of time of arrival between each lowest partition, and then ascertaining an average PFA, or mean PFA or other combined metric PFA for all of the items to arrive at a Global PFA or GPFA for the container 404. (Notwithstanding this specific embodiment, it is to be understood that other arrival frequency metrics or AFMs are contemplated in other embodiments.)

The size metric or SM for the contents of the container 404 can also be based on a variety of factors. In a present embodiment, the size metric or SM is based on an examination of the lowest partitions and examining the number of items within each of the lowest partitions. (Recall that items refer to the file or files, or their contents, within the lowest partition.) Note that each item in the lowest partition may have its own size. For example, in the travel industry, an airline may group domestic flights in one lowest partition and international flights in another lowest partition, and thus the number of flights in each lowest partition will be different. Thus, a container 404 holding such schedules for two different lowest partitions may have different sizes. Accordingly, the size metric or "SM" metadata can be based on first assigning a "Number of Files per Partition" or "NFP" for each lowest partition, and then ascertaining an average NFP, or mean NFP or other combined metric NFP for all of the items to arrive at a Global NFP or GNFP for the container 404. (Notwithstanding this specific embodiment, it is to be understood that other size metric or SMs are contemplated in other embodiments.)

Block 324 can optionally include creating quality metrics associated with the arrival frequency metric and/or the size metric. The quality metrics can reflect the reliability of the GPFA and/or GNFP given the sample set of lower partitions that were available when applying an average, mean or other statistical tool. Including such quality metrics can be employed where the effort of applying those quality metrics provides an overall improvement the in the data integrity monitoring contemplated by this specification.

Thus upon completion of block 324, a set of metadata for monitoring data integrity of a given container 404 now exists. At this point method 300 advances to block 326 and a determination is made if a new container has been received. A "yes" determination at block 326 leads back to block 324 where block 304 and block 308 are performed again for the newly received container. A "no" determination at block 326 leads method 300 directly to block 312 wherein a wait state occurs until a new event is detected in a previously saved container. Note that in our example of container 404-1, if the lowest partition 416 in container 404-1 is updated then a new event in container 404-1 will be detected at block 312 and method 300 will advance to block 316 again. During this iteration, at block 316 a "yes" determination can be made because metadata for the container structure of container 404-1 already exists. (In a presently less-preferred variation, if sufficient metadata did not exist to begin monitoring container 404-1, then method 300 could advance through block 320 and block 324 again for container 404-1, and continue to iterate therethrough until sufficient metadata did exist, until a "yes" determination can eventually be made at block 316.)

A "yes" determination at block 316 leads to block 328. Block 328 comprises determining if the event detected at block 312 corresponded to the creation of a partition. Creation can also encompass updates to the partition as desired by a person skilled in the art. A "no" determination may occur at block 328 since many different events can occur within a container 404, and not all events are relevant to the data integrity check contemplated in the present embodiment. Thus a "no" determination leads to block 332 and the event detected at block 312 is ignored, and method 300 returns to block 326. (In a variation of method 300, block 328 and block 332 can be omitted where block 312 is modified to only detect events that correspond to creation or updates to a partition.)

A "yes" determination at block 328 leads to block 336 at which point the event detected at block 312 is processed by updating the metadata associated with the container in which the event was detected. Again, the approaches used to update the metadata is not particularly limited, as many such approaches can align with the goal of improving overall data integrity monitoring in system 100. In a present embodiment, the updates are to the GPFA and the GNFP as new events involving the lowest partitions are detected.

In general terms, the update to the GPFA is based on tracking the time between the present time when the event at block 312 occurred and the previous time that the event at block 312 occurred. Expressed differently, GPFA is generally based on the time difference successive between "yes" determinations at block 328.

Figure 8:
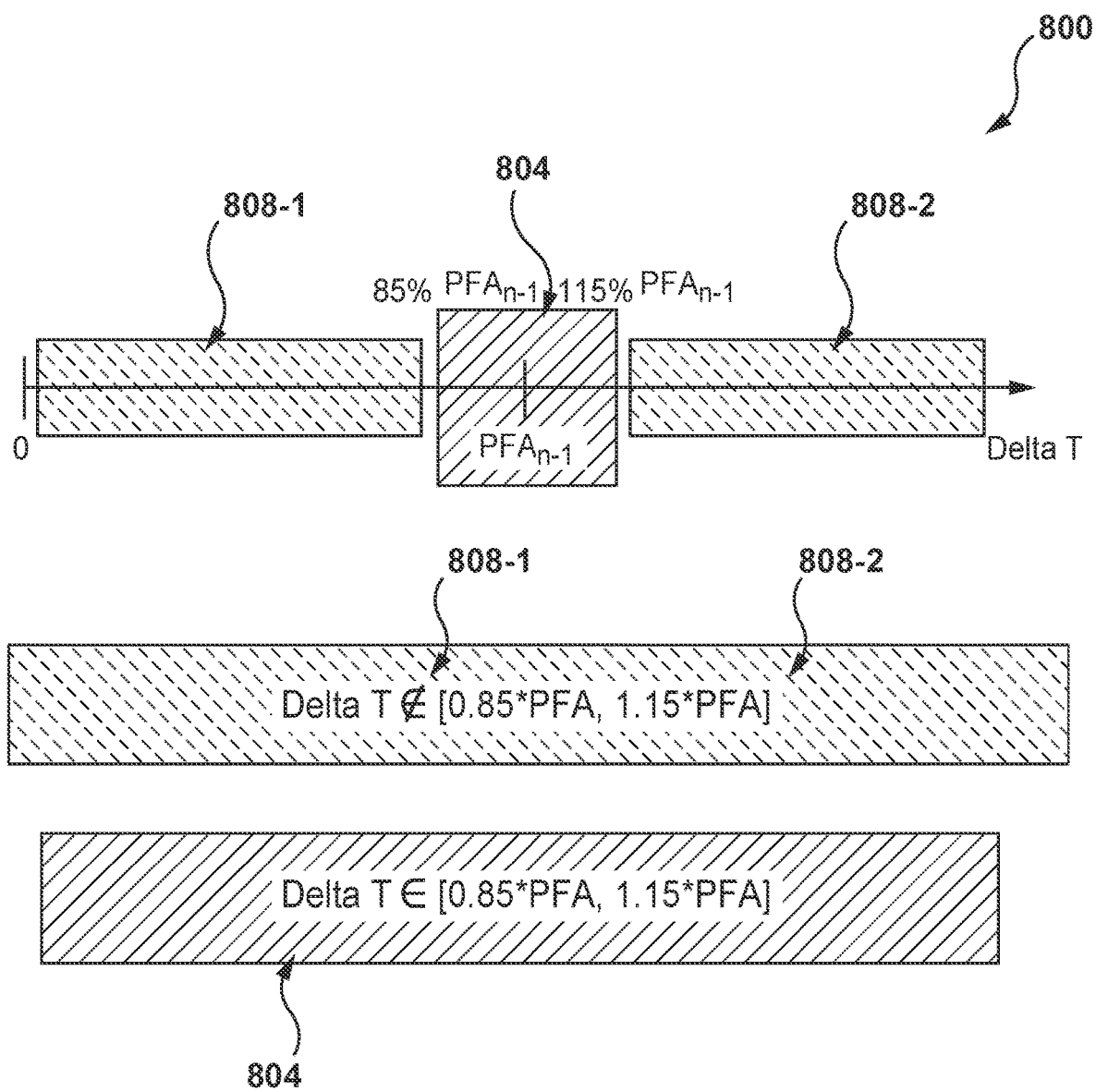
FIG. 8 shows a graph representing monitoring of frequency of arrival of data in the cloud computing platform.

In a specific non-limiting example of how determining GPFA at block 336 can be effected, FIG. 8 shows a graph 800 according to a method of effecting updates to the global partition frequency of arrival or GPFA, according to the following formula:

$$PFA_n = PFA_{n-1} + \frac{1}{n+p}|DeltaT - PFA_{n-1}|$$

Where:
n=current iteration (corresponds to present event)
p=number of folders that hold partitions inside them
GPFA=$PFA_n$
PFA=Partition Frequency of Arrival
LPT=Time of arrival of the very last partition in the container during the present event
Delta T=$LPT_n$–$LPT_{n-1}$ Thus according to graph 800, the updates to the GPFA are based on an time differential between the present event and the previous event according to the above formulas. It is to be emphasized however that other approaches to determining a GPFA are contemplated and will occur to those of skill in the art.

In general terms, the update to the GNFP is based on tracking changes to the size of the data within the container 404 associated with the event at block 312 between the present iteration of block 312 the previous iteration of block 312. Expressed differently, GPFA is generally based on the difference is size of the data within the relevant container 404 successive between "yes" determinations at block 328.

In a specific non-limiting example of how determining GNFP at block 336 can be effected, the number of files within the lowest partition are counted to arrive at a GNFP at the present iteration which is then compared with a baseline GNFP. (Note that a baseline GNFP is achieved when sufficient number of iterations have occurred such that the GNFP does not change, or when a maximum number of predefined iterations have occurred. The baseline GNFP can either be set by repeated iterations of block 324, or block 336).

Continuing with method 300, once block 336 is complete method 300 proceeds to block 340, at which point a determination is made as to whether a metadata threshold criteria has been met. In other words, block 340 comprises the data integrity check, whereby if the metadata is not within certain thresholds then a data integrity error is considered to have been detected. A "yes" determination at block 340 qualifies as a data integrity error, whereas a "no" determination flags no data integrity error. A "no" determination at block 340 leads back to block 326 for method 300 to renew its cycle. A "yes" determination at block 340 leads to a response process at block 344.

According to the specific example embodiments discussed above, a "yes" determination at block 340 may occur when GPFA data integrity error is noted according to the criteria in FIG. 8. To elaborate, if a DeltaT is less than a first threshold (for example, about 85%, although any desired number can be chosen) of the previous GPFA, then a "yes" determination occurs at block 340. If a DeltaT is greater than a second threshold (for example, about 115%, although any desired number can be chosen) of the previous GPFA, then a "yes" determination occurs at block 340. The succinct point is that the time between updates to the items in container 404 were either too rapid or too slow, such that the integrity of the update to the container 404 is considered of suspect value for data aggregation engine 112.

A "yes" determination at block 340 may also occur when GNFP data integrity error is noted. To elaborate, the GFNP for a present iteration deviates from the baseline GPFA, then a "yes" determination occurs at block 340. (While tolerance threshold ranges for GPFA are not proposed for the presently preferred embodiment, it is contemplated that persons of skill in the art may encounter certain applications that warrant a tolerance.) The succinct point is if the size of the items in container 404 are changing, then the integrity of the update to the container 404 is considered of suspect value for data aggregation engine 112.

The "yes" determination at block 340 thus brings method 300 to block 344. A wide variety of response processes at block 344 are contemplated, and while a few presently preferred examples are described, a person of skill in the art will, with the benefit of this specification, be led to other types of response processes. The simplest response process includes an alert mechanism or warning message directed at the data source engine 108 that originated the questionable container 404, and/or directed at the data aggregation engine 112 and/or directed at client devices 116. The response process at block 340 can also include more complex controls over system 100 or other computing nodes that connect to system 100. In the context of the travel industry, where the questionable container 404 may be deemed to have faulty airline scheduling data then online booking engines that rely on such data can be controlled to prevent bookings that might be based on faulty or out of date data from previous update to container 404. The prevention of such bookings can therefore reduce wastage of computing resources and bandwidth resources across system 100 with erroneous bookings and the subsequent traffic necessary to reverse such erroneous bookings.

The response process at block 340 can also be dependent on certain thresholds for data integrity exceptions. For example, a data marketplace can be created where lower quality data may have a lower pricing, but that data can still be acquired as long as the error rates it may represent are still consistent with the expectations of a given project.

Another response process for block 340 may include a notification back to the data source engine to provide a fix as quickly as possible. In a related fashion, another response process for block 340 may include a notification back to the data source engine to not only fix, but also prevent future needs having to reprocess big chunks of historical data.

In view of the above it will now be apparent that variants are contemplated. For example, certain aspects of the foregoing has been discussed in relation to the travel industry, it will now be understood that the above-described embodiments can be modified to other industries. For example, the financial services industry offers on-line trading. Data integrity from various offerors of financial instruments is also important to the overall confidence, transparency and fairness of the on-line trading platform. Containers in the context of the financial services industry can include, for example, a list of financial instruments that are available for sale or any other data that can be used to facilitate a financial transaction. The present invention is agnostic to the industry and can also include the medical industry whereby medical records are centrally updated in real time. Other industries will now occur to those of skill in the art.

The present invention can be applied to several contexts including the context of when containers such as containers 404 and updates are generated for aggregation within regular intervals and have substantially similar structure characteristics such as a magnitude of data, which can be expressed in terms of a file size, data size, and/or other characteristics. Various industrial application will now occur those of skill in the art, including the travel industry. In the travel industry, the regular intervals for containers correspond with the regular updates and changes to the data associated with travel resources, such as airline seats which may become unavailable due to having been sold. Other updates to airline travel resources include the addition of new flights, cancellation of flights, or departed flights. The substantially similar file structure characteristics correspond to the fact that the sets of travel resources that compose a given container are generally fixed. Rather, it is the availability, scheduling and pricing of those travel resources that changes. A person of skill in the art will also note how the dynamics scale across system 100, as containers such as container 404, and their updated containers, are regularly generated by each data source engine 108 for aggregation by engine 112. Accordingly, deviations in the interval frequency and file structure characteristics of all containers over time can result in data integrity failures which can negatively impact overall behaviour of system 100 since aggregated data presented at client devices 116 may become unreliable. The unreliability of the aggregated data can result in potential failures such as erroneous booking instructions. For example, in the context of an airline flight, an erroneous booking instruction could be sent from a client device 116 as a result of a data integrity failure of a given container. For example, assume that an update to container 404 fails to be sent from data source engine 108-1, which results in data integrity failure. Also assume that the updated container contains seat availability information whereby certain seats for a given flight have now been booked as compared to the original container 404. The result of such a data integrity failure then requires, at a minimum, additional wasted network traffic over network 106 in order to reverse the erroneous booking. This problem of wasted network and processing resources thus scales negatively over the entirety of system 100 for each data integrity lapse in containers such as container 404. The present invention serves to reduce such lapses thereby increasing efficient use of network and processing resources. Another advantage is that data integrity is monitored, by way of metadata, without having to analyze the data itself. This simplifies processes and can preserve privacy and encryption requirements.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A data integrity monitoring system, comprising:
a cloud server connected to a data source engine via a network and having:
   a storage unit;
   a file server for receiving data from the data source engine and saving the data in the storage unit;
   an event handler connected to the file server for detecting events representing the saving of the data;
   a queuing engine connected to the event handler for storing metadata of the events; and
a monitoring engine connected to the cloud server and configured to:
   determine characteristics of the metadata including:
      a difference between (i) a time elapsed between receipt of the data and receipt of a preceding update to the data, and (ii) an average time between updates corresponding to the data; and
      a difference between (i) a number of files in the received data, and (ii) a baseline number of files corresponding to the received data;
   determine whether the characteristics of the metadata exceed at least one data integrity threshold;
   when the characteristics of the metadata exceed the at least one data integrity threshold, initiate a response process to control availability of partition data associated with the events to an engine that accesses the partition data.

2. The system of claim 1 wherein the cloud server is connectable to at least one data aggregation engine.

3. The system of claim 1 wherein the monitoring engine is incorporated into the cloud server.

4. The system of claim 1 wherein the monitoring engine is further configured, when the characteristics of the metadata exceed the at least one data integrity threshold, to transmit an alarm message to a data aggregation engine.

5. A method comprising:
detecting, at a cloud server, an event corresponding to a new partition within a pre-existing container;
generating a set of new metadata corresponding to the container;
determining characteristics of the metadata including:
   a difference between (i) a time elapsed between receipt of data into the partition and receipt of a preceding update to the data, and (ii) an average time between updates corresponding to the data; and
   a difference between (i) a number of files in the received data, and (ii) a baseline number of files corresponding to the received data;
determining whether the characteristics of the metadata exceed at least one data integrity threshold; and
when the characteristics of the metadata exceed the at least one data integrity threshold, controlling an interactive graphical interface on a client device to prevent response input based on contents of the container associated with the event.

6. The method of claim 5 wherein the event occurs inside an event handler engine of the cloud server and the container is maintained by a file server and storage within the cloud server.

7. The method of claim 5 wherein the partition is populated by a data source engine that connects to the cloud server and the partition is ready by an aggregation engine that connects to the cloud server.

* * * * *